(12) United States Patent
Sharma et al.

(10) Patent No.: US 8,037,703 B2
(45) Date of Patent: Oct. 18, 2011

(54) HEAT RECOVERY SYSTEM FOR A TURBOMACHINE AND METHOD OF OPERATING A HEAT RECOVERY STEAM SYSTEM FOR A TURBOMACHINE

(75) Inventors: Anil Kumar Sharma, Rewa (IN); Shinoj Vakkayil Chandrabose, Thrissur (IN); Prakash Narayan Govindan, Chennia (IN)

(73) Assignee: General Electric Company, Schenectady, NY (US)

( * ) Notice: Subject to any disclaimer, the term of this patent is extended or adjusted under 35 U.S.C. 154(b) by 571 days.

(21) Appl. No.: 12/183,596

(22) Filed: Jul. 31, 2008

(65) Prior Publication Data
US 2010/0024444 A1  Feb. 4, 2010

(51) Int. Cl.
*F25B 27/00* (2006.01)
(52) U.S. Cl. .......................... 62/238.3; 62/476
(58) Field of Classification Search ............... 62/79, 111, 62/238.3, 238.6, 476, 478, 479, 485, 513
See application file for complete search history.

(56) References Cited

U.S. PATENT DOCUMENTS

| | | | |
|---|---|---|---|
| 3,423,078 A | | 1/1969 | May |
| 3,796,045 A | * | 3/1974 | Foster-Pegg .................. 60/772 |
| 3,831,667 A | | 8/1974 | Kilgore et al. |
| 4,223,529 A | | 9/1980 | Willyoung |
| 4,353,217 A | | 10/1982 | Nishioka et al. |
| 4,379,485 A | | 4/1983 | Fisher, Jr. et al. |
| 4,520,634 A | | 6/1985 | Oouchi et al. |
| 4,655,975 A | | 4/1987 | Snoble |
| 5,555,738 A | | 9/1996 | DeVault |
| 5,675,970 A | | 10/1997 | Yamada et al. |
| 5,787,970 A | | 8/1998 | Larinoff |
| 6,058,695 A | | 5/2000 | Ranasinghe et al. |
| 6,170,263 B1 | | 1/2001 | Chow et al. |
| 7,178,348 B2 | | 2/2007 | Stuhlmueller |
| 2006/0123767 A1 | | 6/2006 | Briesch |
| 2007/0006565 A1 | | 1/2007 | Fleischer et al. |

* cited by examiner

*Primary Examiner* — Melvin Jones
(74) *Attorney, Agent, or Firm* — Cantor Colburn LLP

(57) ABSTRACT

A heat recovery system includes a source of waste heat, and a refrigeration system operatively connected to the source of waste heat. The refrigeration system is capable of extracting heat rejected from the source of waste heat to form a cooling medium.

12 Claims, 1 Drawing Sheet

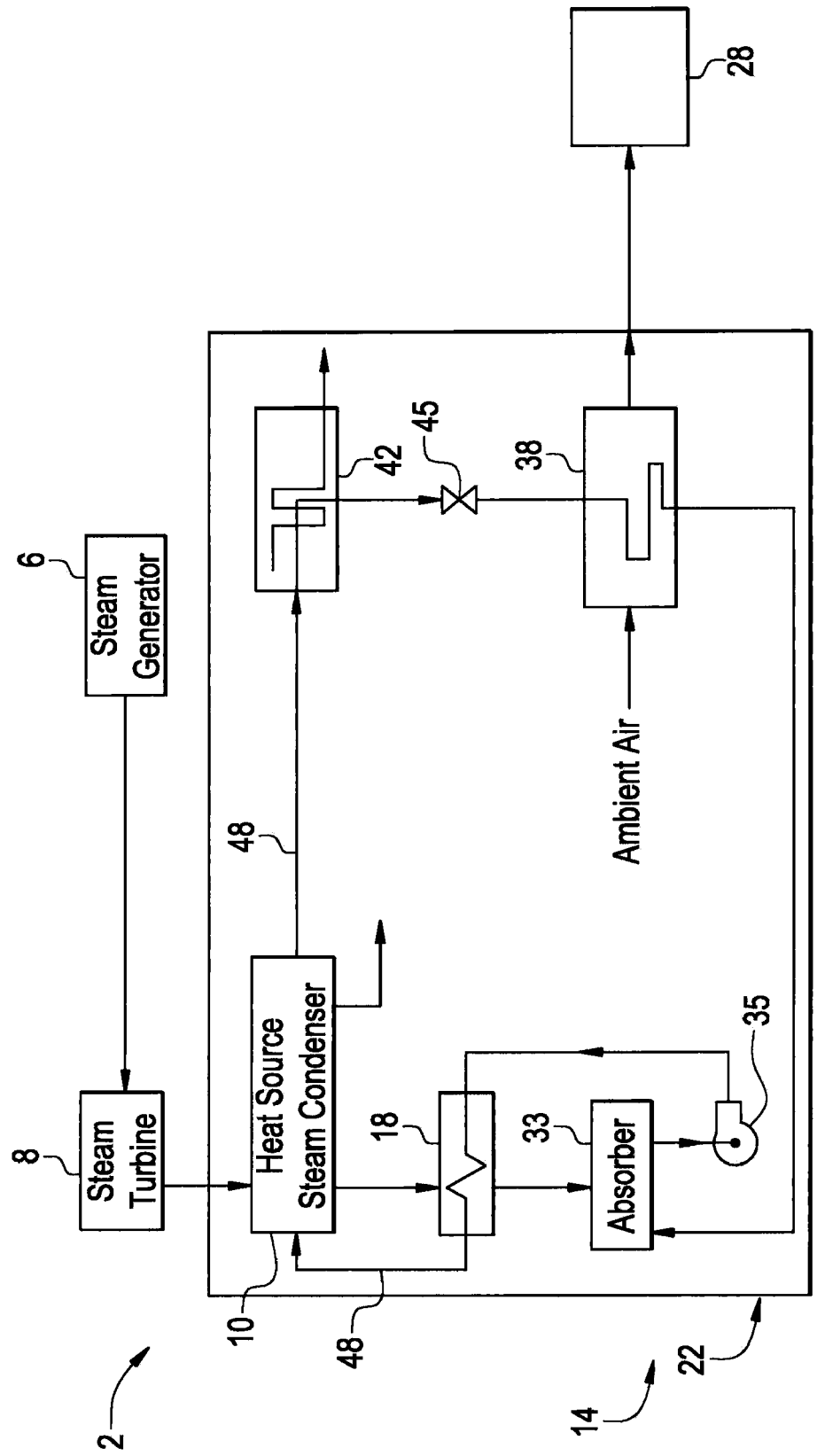

HEAT RECOVERY SYSTEM FOR A TURBOMACHINE AND METHOD OF OPERATING A HEAT RECOVERY STEAM SYSTEM FOR A TURBOMACHINE

BACKGROUND OF THE INVENTION

Exemplary embodiments of the present invention relate to the art of turbomachines and, more particularly, to a heat recovery system for a turbomachine.

In gas and steam turbine combined systems there exists a thermodynamic requirement to reject a large amount of low grade heat. For example, in a typical gas and steam turbine combined cycle power plant having a three pressure reheat recovery steam generator (HRSG), about 33% of heat is rejected at a steam condenser of the power plant. This rejected heat represents an overall efficiency loss for the power plant.

There currently exist power plants that utilize heat rejected directly from the steam turbine to power a refrigeration system. The refrigeration system is utilized to cool inlet air for a compressor, or as a cooling source for associated structures and enclosures in the power plant. The needed steam is taken directly from the steam turbine and passed through a vapor absorption refrigeration system. Siphoning steam in this manner lowers the overall efficiency of the steam turbine.

BRIEF DESCRIPTION OF THE INVENTION

In accordance with an exemplary embodiment of the invention, a heat recovery system includes a source of waste heat, and a refrigeration system operatively connected to the source of heat. The refrigeration system is capable of extracting heat rejected from the source of waste heat to form a cooling medium.

In accordance with another exemplary embodiment of the invention, a method of operating a heat recovery system includes passing a heat exchange medium through a waste heat source operatively associated with a turbomachine, extracting heat from the waste heat source into the heat exchange medium, directing the heat exchange medium through to a refrigeration system, and extracting the heat from the heat exchange medium to produce a cooling medium.

In accordance with yet another exemplary embodiment of the invention, turbomachine heat recovery system includes a waste heat source operatively coupled to the turbomachine, and a refrigeration system operatively connected to the waste heat source. The refrigeration system is capable of extracting heat rejected from the heat source to form a cooling medium.

BRIEF DESCRIPTION OF THE DRAWINGS

FIG. 1 is a schematic diagram of a heat recovery system including a refrigeration system operatively coupled to a turbomachine in accordance with exemplary embodiments of the invention.

DETAILED DESCRIPTION OF THE INVENTION

With initial reference to FIG. 1, a turbomachine system, constructed in accordance with exemplary embodiments of the present invention, is indicated generally at 2. In the exemplary embodiment shown, turbomachine system 2 is a Rankin cycle based system and includes a steam generator 6 operatively connected to a steam turbine 8. As further shown in FIG. 1, steam turbine 8 includes an associated waste heat source, such as a condenser 10 that is operatively coupled to a heat recovery system 14 via a heat exchanger 18. Of course it should be understood that steam turbine 8 includes multiple additional waste heat sources, such as, but not limited to, generator motors, and exhaust from a heat recovery steam generator. As will be discussed more fully below, heat recovery system 14 takes the form of a refrigeration system or vapor absorption machine 22. Vapor absorption machine 22 converts heat rejected from condenser 10 to a cooling medium that is employed, in accordance with one aspect of the invention, to provide cooling to an external cooling mechanism such as, for example, a cooling tower 28.

In further accordance with the exemplary embodiment shown, vapor absorption machine 22 includes an absorber 33 fluidly connected to a heat exchanger 18, as well as a pump 35 and an evaporator 38. Evaporator 38 is fluidly connected to a condenser 42 via an expansion valve 45. Condenser 42, in turn, is fluidly connected to waste heat source or condenser 10 to form a fluid circuit 48. With this arrangement, waste heat rejected from condenser 10 is transferred to a fluid passing through fluid circuit 48 to condenser 42. A refrigeration medium, such as ammonia or the like, passing through condenser 42 to extracts heat from the fluid passing through fluid circuit 48 to form a cooling medium. The cooling medium is directed to evaporator 38 via expansion valve 45. Ambient air passing over evaporator 38 creates a cooling air flow that is passed to cooling tower 28. At this point, the cooling medium is passed through absorber 33 back through heat exchanger 18 to withdraw any remaining heat. The fluid is passed back to waste heat source or condenser 10 to begin the cycle anew. In this manner, waste heat associated with operation of steam turbine 8 is utilized to produce a cooling medium. The cooling medium is then utilized to provide cooling to, for example, a cooling tower. The utilization of waste heat produces an approximate 1.0 megawatt increase in available power produced by an associated power generation system. This increase in output represents an approximately 0.1% increase in power plant efficiency.

At this point it should be appreciated that the heat exchange system can vary in accordance with the present invention. That is, only a portion of the heat rejected from condenser 10 need be passed into heat recovery system 14. That is, additional heat produced within waste heat source 10 can be rejected to ambient air or, to cooling water in cooling tower 28. Also, it should be noted that in addition to providing cooling for cooling tower 28, a cooling medium can be used to produce a cooling effect that is used as a compressor input or, to provide refrigeration for associated structures.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:
1. A heat recovery system comprising:
a steam turbine having source of waste heat; and
a vapor absorption refrigeration system operatively connected to the source of waste heat, the refrigeration system being capable of extracting heat rejected from the source of heat to form a cooling medium.

2. The heat recovery system according to claim 1, wherein the source of waste heat is a steam condenser.

3. The heat recovery system according to claim 1, further comprising: a cooling tower operatively connected to the refrigeration system.

4. The heat recovery system according to claim 1, further comprising: a heat exchanger fluidly connected between the source of heat and the refrigeration system.

5. The heat recovery system according to claim 1, wherein the heat recovery system is operatively connected to a steam turbine.

6. A method of operating a heat recovery system comprising:
- passing a heat exchange medium through a waste heat source operatively associated with a steam turbine;
- extracting heat from the waste heat source into the heat exchange medium;
- directing the heat exchange medium through to a vapor absorption refrigeration system; and
- extracting the heat from the heat exchange medium to produce a cooling medium.

7. The method of claim 6, further comprising: passing a fluid in heat exchange communication with the cooling medium to a cooling tower, the cooling medium lowering a temperature of the fluid.

8. The method of claim 6, wherein, passing the heat exchange medium through the waste heat source comprises passing the heat exchange medium through a steam condenser.

9. A turbomachine heat recovery system comprising:
- a waste heat source operatively coupled to a steam turbine; and
- a vapor absorption refrigeration system operatively connected to the waste heat source, the vapor absorption refrigeration system being capable of extracting heat rejected from the waste heat source to form a cooling medium.

10. The turbomachine heat recovery system according to claim 9, wherein the waste heat source is a steam condenser.

11. The turbomachine heat recovery system according to claim 9, further comprising: a cooling tower operatively connected to the refrigeration system.

12. The turbomachine heat recovery system according to claim 9, further comprising: a heat exchanger fluidly connected between the waste heat source and the refrigeration system.

* * * * *